Sept. 2, 1924.
J. S. DUNCAN
RIBBON SPOOL
Filed May 29, 1922
1,506,890
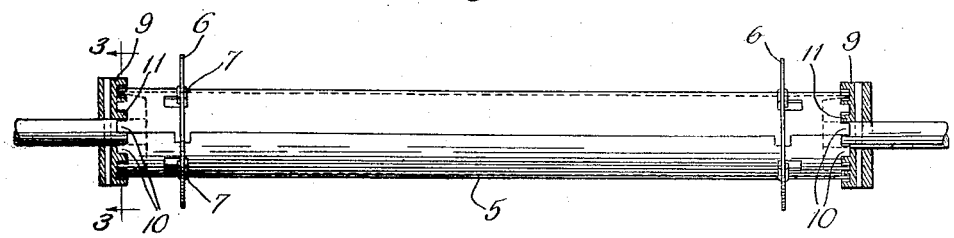
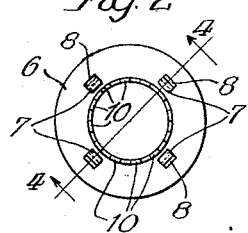
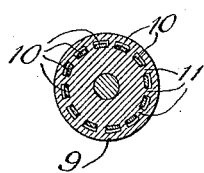
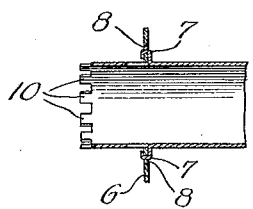

Patented Sept. 2, 1924.

1,506,890

UNITED STATES PATENT OFFICE.

JOSEPH S. DUNCAN, OF CHICAGO, ILLINOIS, ASSIGNOR TO ADDRESSOGRAPH COMPANY, OF CHICAGO, ILLINOIS, A CORPORATION OF ILLINOIS.

RIBBON SPOOL.

Application filed May 29, 1922. Serial No. 564,340.

*To all whom it may concern:*

Be it known that I, JOSEPH S. DUNCAN, a citizen of the United States, residing at Chicago, in the county of Cook and State of Illinois, have invented certain new and useful Improvements in Ribbon Spools, of which the following is a specification.

The object of this invention is to provide an ink ribbon spool of simple and substantial construction adapted to be easily and securely engaged with driving means to make interlocking engagement therewith for revolving the spool to feed the ribbon as required.

In the accompanying drawing illustrating a selected embodiment of the invention—

Fig. 1 illustrates my improved spool clamped between driving heads which are shown in section;

Fig. 2 is an end view of the spool;

Fig. 3 is a sectional view on the line 3—3 of Fig. 1;

Fig. 4 is a sectional view on the line 4—4 of Fig. 2.

Referring to the drawings the spool 5 is preferably made of a single sheet of thin metal bent to cylindrical shape and provided near is ends with circular disk flanges 6, 6 which are rigidly secured upon the spool to form end flanges for the ribbon, which is wound on the spool between the flanges, and to reinforce and strengthen the spool, by lips 7 struck up from the body and engaged with openings 8 in the flanges, or by other suitable means.

The spool is shown open at its ends and the end edges are toothed to engage corresponding teeth on the heads 9, 9. The teeth 10 on the spool and the teeth 11 on the heads project in the direction of the length of the spool, and the teeth on the spool as well as the teeth on the heads may be made in any number and in any size or shape and disposed in any manner desired around the spool to make interlocking engagement, I prefer to make both ends of the spool alike and both heads alike but it will only be necessary for driving the spool to provide for an interlocking engagement between one end of the spool and one head. However it is desirable that both ends of the spool should be toothed so that either end may be engaged with the driving head. If the spool is interlocked at one end with the driving head it will not be necessary for the other end of the spool and the head which engages therewith to be toothed, but I think it better to have both ends of the spool and both heads toothed, even though one head only may be a driving head.

The spool can be easily made at comparatively low cost; it is strong and substantial in construction and it can be readily engaged with or disengaged from the heads between which it is clamped for practical use. The longitudinally projecting teeth constitute an efficient and simple means for making operative connection with the driving means for revolving the spool and no especial care or attention is required for the purpose of engaging or disengaging the spool and heads. I have not shown the means for driving the heads or for operating one or both of the heads to revolve the spool because such means are common in the art and may be used in many different forms and constructions.

I am aware that changes in the form and proportion of parts of my invention may be made without departing from the spirit or sacrificing the advantages thereof and I reserve the right to make all such changes, modifications and adaptations as fairly fall within the scope of the following claim.

I claim:

A ribbon spool made of sheet metal bent to cylindrical form and having flanges thereon spaced from the ends to form guides for the ribbon, the ends of the spool being open and provided with a plurality of teeth disposed thereabout and extending in the direction of the length of the spool and entirely through the wall thereof to make interlocking engagement with driving means for revolving the spool.

JOSEPH S. DUNCAN.